United States Patent [19]

Onishi et al.

[11] Patent Number: 4,884,649
[45] Date of Patent: Dec. 5, 1989

[54] CRUISE CONTROL APPARATUS

[75] Inventors: Masayoshi Onishi; Yasuo Naitou; Takeshi Yasukawa, all of Himeji, Japan

[73] Assignee: Mitsubishi Denki Kabushiki Kaisha, Japan

[21] Appl. No.: 96,450

[22] Filed: Sep. 15, 1987

[30] Foreign Application Priority Data

Sep. 18, 1986 [JP] Japan .................. 61-222516
Sep. 18, 1986 [JP] Japan .................. 61-222517
Sep. 18, 1986 [JP] Japan .................. 61-222518

[51] Int. Cl.$^4$ ............................................... B60K 31/00
[52] U.S. Cl. .................................. 180/179; 310/68 B; 363/147; 357/81
[58] Field of Search .................. 180/178, 179; 357/81; 310/68 B; 318/254; 363/147

[56] References Cited

U.S. PATENT DOCUMENTS

| | | | |
|---|---|---|---|
| 4,117,903 | 10/1978 | Fleischer et al. | 180/179 |
| 4,132,284 | 1/1979 | Tomecek | 180/105 E |
| 4,161,994 | 7/1979 | Collonia | 180/179 |
| 4,187,734 | 2/1980 | Mann | 180/178 X |
| 4,202,424 | 5/1980 | Sakakibara et al. | 180/176 |
| 4,242,608 | 12/1980 | Ishikagi et al. | 318/254 A X |
| 4,250,854 | 2/1981 | Matsui et al. | 180/179 |
| 4,287,782 | 9/1981 | Ruschek | 180/179 X |
| 4,304,202 | 12/1981 | Schofield | 123/363 |
| 4,383,510 | 5/1983 | Nakamura et al. | 180/179 X |
| 4,417,386 | 11/1983 | Exner | 357/81 X |
| 4,479,078 | 10/1984 | Kidd et al. | 318/254 |
| 4,510,422 | 4/1985 | Ogura | 363/49 X |
| 4,571,529 | 2/1986 | Studer et al. | 318/254 X |
| 4,730,150 | 3/1988 | Lee et al. | 318/254 |

Primary Examiner—Charles A. Marmor
Assistant Examiner—Tamara L. Finlay
Attorney, Agent, or Firm—Leydig, Voit & Mayer

[57] ABSTRACT

A cruise control apparatus for an automobile has a motorized actuator with a motor which adjusts the degree of opening of a throttle valve so as to maintain a desired speed. All or part of the control circuit for the motor is in the form of a hybrid integrated circuit which is mounted on the actuator in a manner such that the actuator can serve as a heat sink for the hybrid integrated circuit. In one form of the invention, the hybrid integrated circuit is mounted on the outer surface of the housing of the actuator motor. In another form of the invention, the hybrid integrated circuit is mounted on the inner surface of the actuator housing. The motorized actuator may be further equipped with a contactless position detector for detecting the rotational position of the output shaft of the actuator motor. The position detector comprises a disk which is rotated by the drive shaft of the actuator, a permanent magnet which is secured to the disk, and two magnetic sensors which detect the magnetic field produced by the permanent magnet. The magnetic sensors are housed within the hybrid integrated circuit.

1 Claim, 4 Drawing Sheets

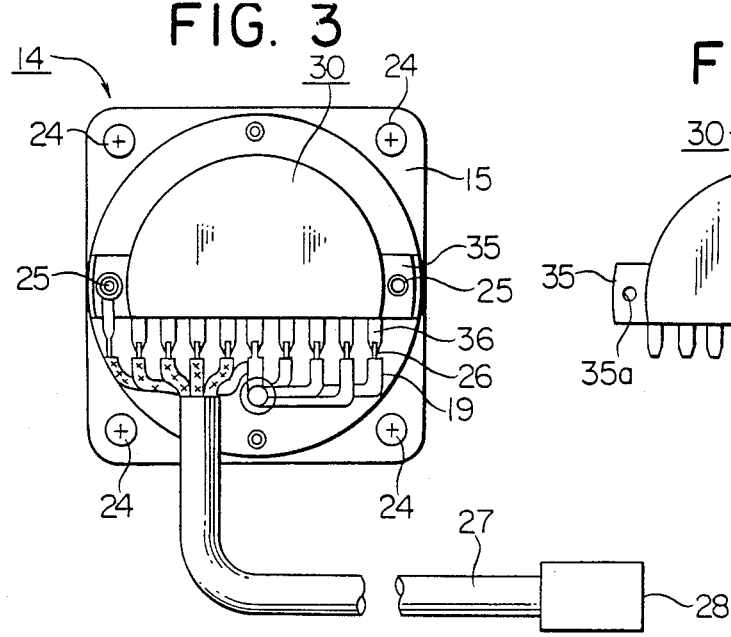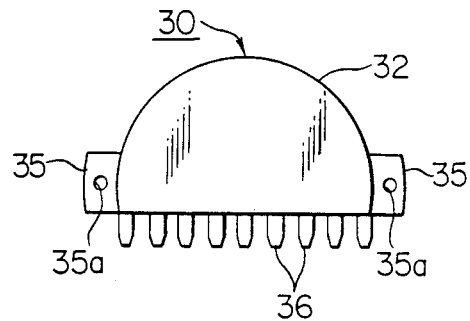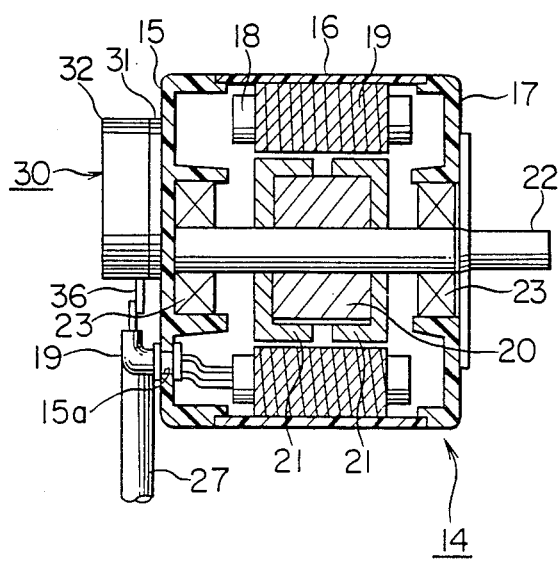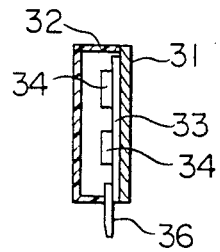

CRUISE CONTROL APPARATUS

BACKGROUND OF THE INVENTION

This invention relates to a cruise control apparatus for an automobile, and more particularly to a compact cruise control apparatus with a motorized actuator.

A cruise control apparatus is a device for maintaining the speed of an automobile at a constant level without the driver having to depress the accelerator pedal. In one type of cruise control apparatus, the speed is controlled by a motorized actuator which adjusts the degree of opening of the throttle valve of the engine of the automobile.

FIG. 1 schematically illustrates a conventional cruise control apparatus of this type. The cruise control apparatus has a motorized actuator 1 which includes an unillustrated control motor such as a polyphase step motor. The control motor has an output shaft on which a wire take-up reel 2 is mounted. A connecting wire 3a has one end wrapped around the take-up reel 2 and the other end secured to one end of a throttle link 5a. The other end of the throttle link 5a is connected to a throttle valve 6 which is pivotably mounted in the barrel 7 of the carburetor of the engine of the automobile. The carburetor barrel 7 communicates with the body 9 of the engine via an intake manifold 8. When the control motor of the actuator is rotated, the connecting wire 3a is reeled in or out, thereby opening or closing the throttle valve 6. An accelerator pedal 4 is also connected to the throttle valve 6 through a connecting wire 3b and a throttle link 5b. With this structure, the degree of opening of the throttle valve 6 can be adjusted either by the rotation of the wire take-up reel 2 by the actuator 1 or by the depression of the accelerator pedal 4 by the driver of the automobile.

The operation of the motorized actuator 1 is controlled by a control unit 11 which is responsive to input signals from a speedometer 10 and a control panel 12 into which the driver inputs a desired speed. The control unit 11 sends command signals to the actuator 1, which adjusts the degree of opening of the throttle valve 6 so that the actual speed of the automobile, as indicated by the input signal from the speedometer 10, is maintained at a desired speed, as indicated by the input signal from the control panel 12.

In a conventional cruise control apparatus for this type, the control unit 11 and the actuator 1 which it controls are separate units which are connected by external electrical wiring. From the standpoint of decreasing electrical noise, it is desirable that the length of wiring between the two be as short as possible. Another reason that the wiring should be short is that the longer the electrical wiring, the more electrical connectors are necessary, and the greater is the possibility of poor electrical connections. However, because of the physical size of the units, it is not always possible to dispose them in close proximity with one another. Therefore, the amount of wiring connecting the two may be undesirably long, resulting in a large amount of electrical noise.

Furthermore, the control unit 11 includes drivers for the motor of the actuator 1. As these drivers generate heat, the control unit 11 must include a heat sink or other means for dissipating the heat from the drivers. This increases the size of the control unit 11 and imposes limitations on the locations in which it can be installed.

In addition, the control accuracy of the control unit 11 is determined by the total of the dispersion among all the elements. Generally, representative values of the gain of the vehicle and the gain of the actuator 1 are used, and the apparatus is adjusted to have an average gain value which is relatively in agreement with the representative values. As a result, due to dispersion among vehicles and actuators, when the apparatus is mounted in a vehicle, combinations inevitably result which cause functional problems.

SUMMARY OF THE INVENTION

Accordingly, it is an object of the present invention to provide a cruise control apparatus for an automobile which is more compact than a conventional cruise control apparatus.

It is another object of the present invention to provide a cruise control apparatus which has increased resistance to electrical noise.

It is still another object of the present invention to provide a cruise control apparatus which employs less external wiring between the various portions of the apparatus.

It is yet another object of this invention to provide a cruise control apparatus which enables a matching of the gain of the cruise control apparatus with the gain of the automobile.

It is still another object of the present invention to provide a cruise control apparatus which has fewer mechanical parts than a conventional cruise control apparatus.

A cruise control apparatus for an automobile in accordance with the present invention is of the type having a motorized actuator with an electric motor which opens and closes the throttle valve of the engine of the automobile so as to maintain a constant vehicle speed. The operation of the motorized actuator is controlled by a control means which includes a motor control circuit for controlling the electric motor of the actuator. At least a portion of the motor control circuit is in the form of a hybrid integrated circuit which is mounted on the motorized actuator.

There is no restriction on the exact portion of the actuator on which the hybrid integrated circuit is mounted. Preferably, however, the hybrid integrated circuit is mounted on the actuator in a manner such that the actuator can serve as a heat sink for the hybrid integrated circuit. In one embodiment, the hybrid integrated circuit is mounted on the outside of the housing of the motor of the actuator. In another embodiment, the hybrid integrated circuit is mounted on one of the inner surfaces of the housing of the actuator.

The actuator may be further equipped with a contactless position detector for detecting the rotational position of the output shaft of the actuator motor. In a preferred embodiment, the position detector has a pair of magnetic sensors housed within the hybrid integrated circuit. The magnetic sensors are sensitive to the magnetic field generated by a magnet which is mounted on a rotating disk which rotates with the drive shaft of the actuator. When the permanent magnet passes in the vicinity of the magnetic sensors, they generate electrical signals on the basis of which the degree of rotation of the actuator motor is controlled.

BRIEF DESCRIPTION OF THE DRAWINGS

FIG. 3 is an end view of a step motor of a motorized actuator of a first embodiment of the present invention.

FIG. 4 is a longitudinal cross-sectional view of the step motor of FIG. 3.

FIG. 5 is a plan view of the hybrid integrated circuit which is mounted on the housing of the step motor of FIG. 4.

FIG. 6 is a vertical cross-sectional view of the hybrid integrated circuit of FIG. 5.

In the drawings, the same reference numerals indicate the same or corresponding parts.

DESCRIPTION OF THE PREFERRED EMBODIMENTS

Figure 1:
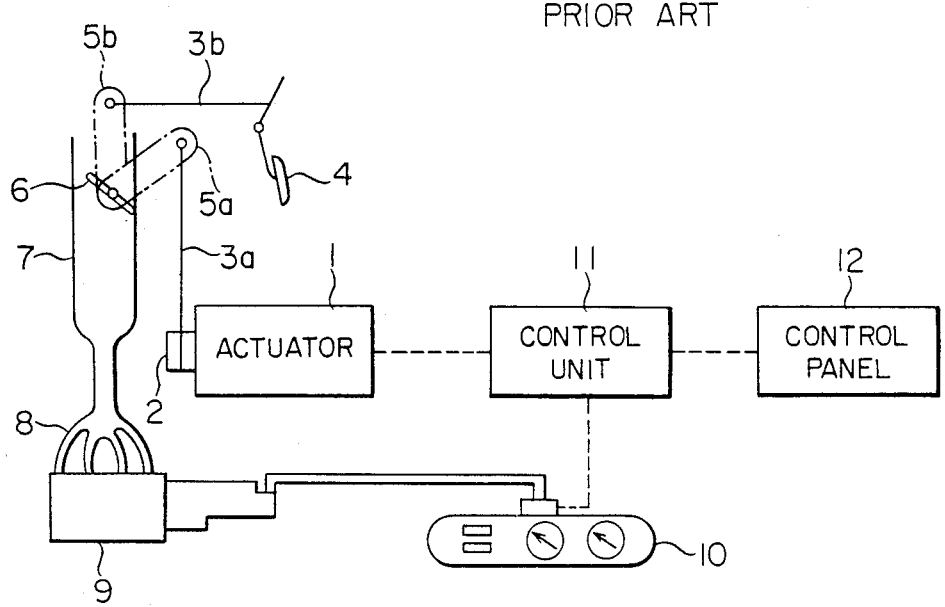
FIG. 1 is a schematic view of a conventional cruise control apparatus with a motorized actuator.

Hereinbelow, a number of preferred embodiments of a cruise control apparatus will be described while referring to the accompanying drawings, FIG. 2 of which schematically illustrates the structure of a cruise control apparatus in accordance with this invention. The overall structure of this apparatus differs from that of the conventional apparatus of FIG. 1 in that all or a part of the control circuit for the motor of a motorized actuator 1 is in the form of a hybrid integrated circuit 30 which is secured to a suitable portion of the actuator 1. The other portions of the control circuit for the actuator 1 are contained in a control unit 13 which is electrically connected to the hybrid integrated circuit 30, the speedometer 10 of the automobile, and a control panel 12 by means of which the driver of the automobile inputs the desired cruise speed.

In a first embodiment of the present invention, the hybrid integrated circuit 30 is mounted on the outside of the housing of the motor of the actuator 1 in contact with the outer surface of the housing. FIGS. 3 and 4 are respectively an end view and a longitudinal cross-sectional view of a portion of the actuator 1 of this embodiment. As shown in these figures, the actuator 1 has a step motor 14 with a cylindrical housing comprising a front section 15, a middle section 16, and a rear section 17 which are rigidly secured to one another. A stator core 18 having stator windings 19 wrapped around it is rigidly secured to the inner surface of the middle section 16 of the motor housing. The rotor of the step motor 14 comprises a permanent magnet 20 and two armatures 21 which are rigidly secured to a rotating output shaft 22. The output shaft 22 is journalled by two bearings 23 which are respectively secured to the front section 15 and the rear section 17 of the motor housing. The step motor 14 is held together by a plurality of through bolts 24.

Referring additionally to FIGS. 5 and 6, which are respectively a plan view and a vertical cross-sectional view, the hybrid integrated circuit 30 has a heat sink 31 made of aluminum or other suitable material, a molded casing 32, and a ceramic base 33 on which parts pellets 34 are mounted. A plurality of connecting pins 36 extend to the outside of the molded casing 32. The heat sink 31 has two tabs 35 formed thereon which extend to the outside of the casing 32. Each tab 35 has a through hole 35a formed therein, and the hybrid integrated circuit 30 is secured to the outer end surface of the front section 15 of the motor housing by screws 25 which pass through these holes 35a and screw into corresponding holes in the motor housing. The heat sink 31 of the hybrid integrated circuit 30 is in contact with the outer surface of the front section 15 so that the heat can be transferred from the heat sink 31 to the motor housing. The screw 25 on the lefthand side of FIG. 3 also serves as a ground terminal.

A number of the connecting pins 36 are electrically connected by connectors 26 to the ends of the stator windings 19e which pass through a hole 15a formed in the front section 15 of the motor housing. Others of the pins 36 are electrically connected by connectors 26 to external leads 27, which are electrically connected to the control unit 13 by a connector 28.

Figure 7:
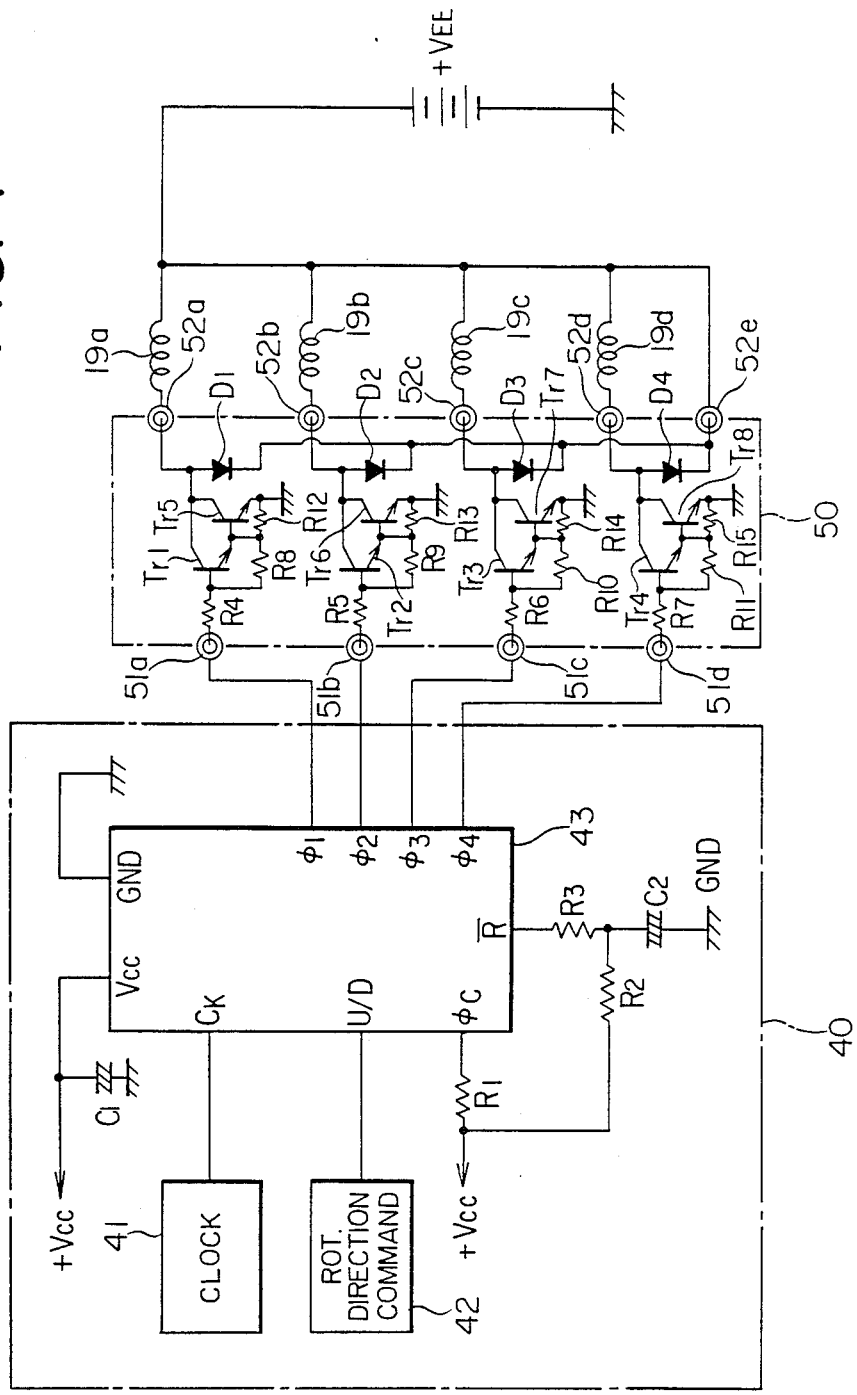
FIG. 7 is a circuit diagram of a control circuit for the step motor of FIG. 4.

FIG. 7 is a schematic diagram of an example of a motor control circuit for the step motor 14 of FIG. 4. The illustrated circuit is for the case in which the step motor 14 is a 4-phase motor. The control circuit comprises a motor control portion 40 which controls the timing of the four phases and a motor drive portion 50 which energizes the stator windings 19 of the motor 14. The motor control portion 40 is an integrated circuit or a ROM designed for motor control. It comprises a clock oscillator 41, a rotational direction command circuit 42, and a signal generator 43 for producing gating signals for the motor drive portion 50.

The motor drive portion 50 has eight transistors TR1–TR8 which are connected so as to form four identical Darlington pairs. The base of one transistor (TR1–TR4, respectively) of each Darlington pair is connected to an input terminal (51a–51d, respectively) via a voltage-dividing resistor (R4–R7, respectively). Signals for gating the Darlington pairs are provided from output ports of the signal generator 43 through these input terminals 51a–51d. The stator windings 19a–19d for the four phases of the step motor 14 are connected to power supply terminals 52a–52d, respectively, which in turn are connected to the collectors of both transistors in each Darlington pair. Each of the power supply terminals 52a–52d is also connected to one of four flywheel diodes D1–D4, respectively. A fifth power supply terminal 52e is connected to the fourth flywheel diode D4. VCC is a power supply for the signal generator 43 and VEE is a power supply for the stator windings 19.

All or a portion of this motor control circuit is constituted by the hybrid integrated circuit 30. Preferably, at least the motor drive portion 50, which generates much heat, is incorporated into the hybrid integrated circuit 30 so that the motor housing can serve as a heat sink for it.

Figure 2:
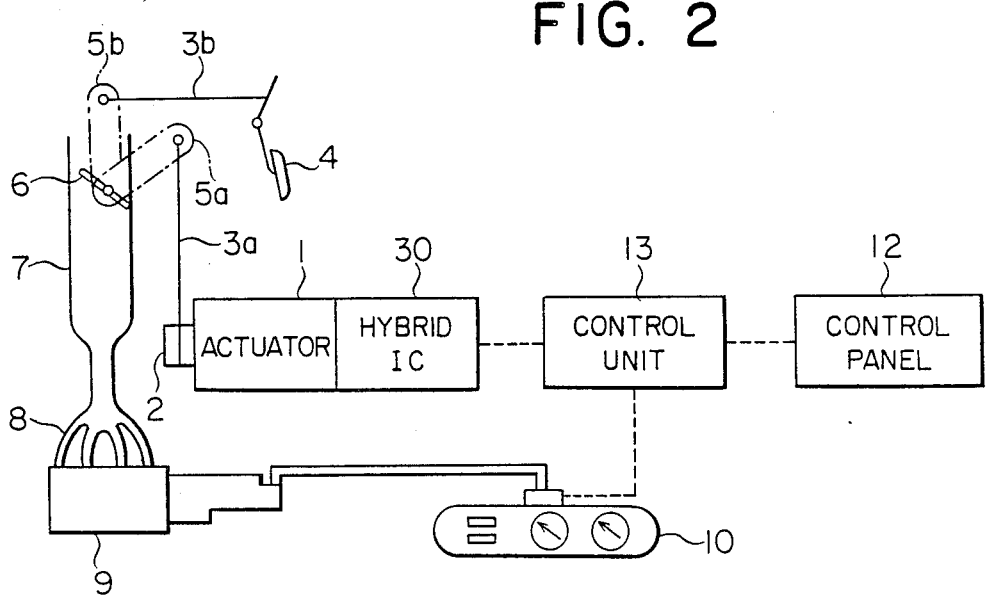
FIG. 2 is a schematic view of a cruise control apparatus in accordance with the present invention.

The operation of this embodiment resembles that of the conventional apparatus of FIG. 1. However, using a hybrid integrated circuit 30 for all or part of the control circuit for the step motor 14 and mounting it on the actuator 1 provides a number of important advantages. For one, by the use of a hybrid integrated circuit, the motor control circuit is made more compact. For another, the motor housing serves a heat sink for the hybrid integrated circuit 30 and the heat generated by the drive portion 50 of the motor control circuit can be effectively dissipated. As the control unit 13 does not need to serve as a heat sink for the drive portion 50, it can be smaller than the conventional control unit 11 of FIG. 1, resulting in a more compact apparatus. Also, as the hybrid integrated circuit 30 is disposed in the immediate vicinity of the stator windings 19, the length of the wiring between the motor 14 and the motor control circuit can be reduced, providing increases in noise resistance and reliability and a decrease in costs. All of these advantages provide greater freedom in the installation of the cruise control apparatus in a vehicle.

Furthermore, the motor gain and the control circuit gain can be matched, so that the gain of the entire cruise control apparatus is highly accurate.

A motorized actuator for a cruise control apparatus is usually equipped with a position detector which detects the rotation of the output shaft of the motor of the actuator. The position detector produces electrical output signals corresponding to the rotational position of the output shaft, on the basis of which the control unit limits the degree of rotation of the motor. Generally, the position detector is an electromechanical device consisting of a pair of microswitches which are actuated by an actuating lever which is secured to an actuator drive shaft which is rotated by the motor output shaft.

Figure 8:
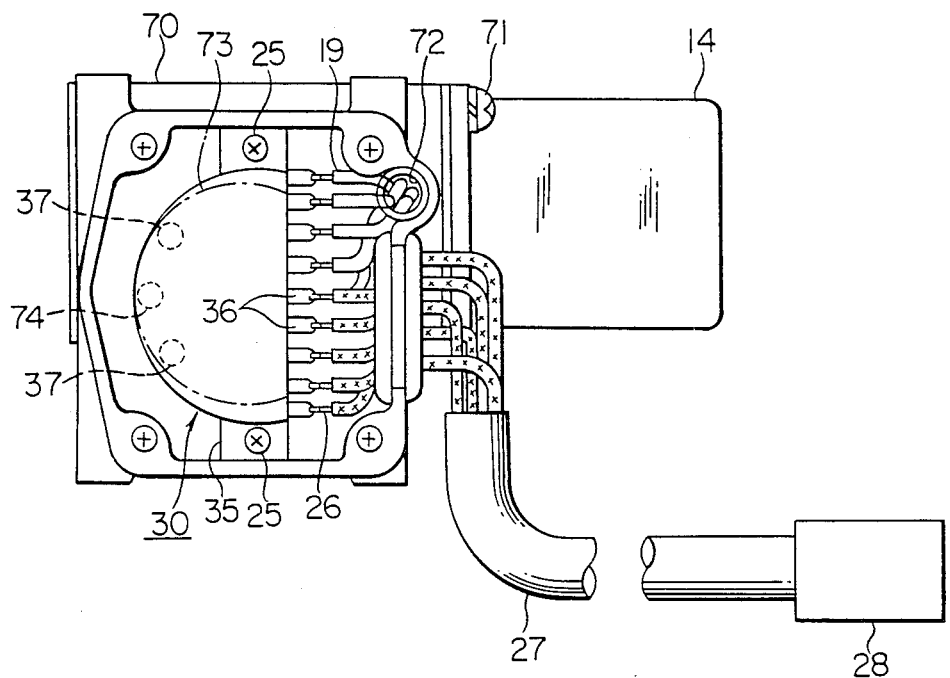
FIG. 8 is a side view of a motorized actuator of a second embodiment of the present invention.

FIG. 8 illustrates a motorized actuator of a second embodiment of the present invention which, instead of a conventional position detector having microswitches, employs a contactless position detector to detect the degree of rotation of the output shaft of the actuator motor. The motorized actuator has a housing 70 on which a step motor 14 like that shown in FIG. 4 is mounted by screws 71. A hybrid integrated circuit 30 like that employed in the previous embodiment is disposed inside the actuator housing 70 and is secured to one of the inner surfaces of the housing 70 by screws 25 which pass through holes 35a formed in the tabs 35 of the hybrid integrated circuit 30. The inner surface of the actuator housing 70 serves as a heat sink for the hybrid integrated circuit 30. As in the previous embodiment, the pins 36 of the hybrid integrated circuit 30 are electrically connected to external leads 27 and to the ends of the stator windings 19e of the step motor 14. The ends of the stator windings 19e pass through a hole 72 formed in the actuator housing 70 and enter the motor housing. The actuator housing 70 has a cover which is normally screwed to the housing 70 and covers the space in which the hybrid integrated circuit 30 is disposed, but in FIG. 8, for the sake of clarity, the actuator housing 70 has been shown with the cover removed.

Figure 9:
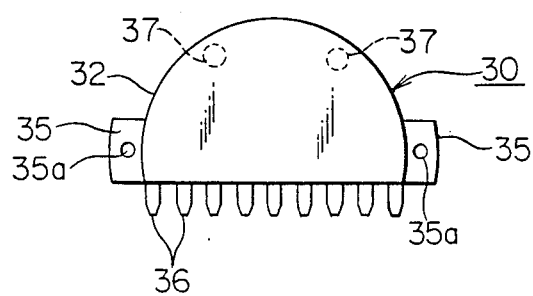
FIG. 9 is a plan view of the hybrid integrated circuit of FIG. 8.

Referring additionally to in FIG. 9, which is a plan view of the hybrid integrated circuit 30 of FIG. 8, the circuit 30 contains two magnetic sensors 37, such as Hall generators, which generate a voltage when they are in a magnetic field. A disk 73 having a permanent magnet 74 secured thereto is mounted on an unillustrated drive shaft of the actuator so as to rotate therewith in the vicinity of the hybrid integrated circuit 30. The actuator drive shaft is rotated by the output shaft of the step motor 14. The magnetic sensors 37 and the permanent magnet 74 are approximately equidistant from the center of rotation of the disk 73 so that when the disk 73 is rotated by a certain angle, the permanent magnet 74 will align with the magnetic sensor 37. The sensors 37 are disposed in locations which correspond to the desired maximum clockwise and counterclockwise rotation of the actuator drive shaft and which thus correspond to the desired maximum rotation of the step motor 14. The magnetic sensors 37, the disk 73, and the permanent magnet 74 together constitute a contactless position detector.

The structure of this embodiment is otherwise identical to that of the previous embodiment, and it operates in the same manner. In addition to the advantages provided by the previous embodiment, it provides the advantage that the hybrid integrated circuit 30 is protected from physical damage since it is disposed inside the actuator housing 70. Furthermore, the contactless position detector is more compact and more reliable than a conventional position detector employing microswitches, and accordingly the compactness and reliability of the motorized actuator can be increased.

In both of the above-described embodiments, the control motor of the motorized actuator 1 is a polyphase step motor 14, but other types of control motors can be employed with the same effects. Accordingly, there is also no limitation on the exact structure of the motor control circuit which is incorporated into the hybrid integrated circuit.

What is claimed is:

1. A cruise control apparatus for an automobile comprising:
    a motorized actuator with an electric motor having a rotating output shaft;
    means for opening and closing the throttle valve of the engine of said automobile in accordance with the angle of rotation of said rotating output shaft;
    means for producing a cruise speed signal corresponding to the cruise speed desired by the driver of said automobile; and
    control means responsive to the actual speed of said automobile and said cruise speed signal for controlling the angle of rotation of the output shaft of said electric motor such that the degree of opening of said throttle valve is maintained at a value at which the speed of said vehicle is approximately equal to the cruise speed desired by said driver, said control means including a motor control circuit for said electric motor, wherein at least a portion of said motor control circuit is a hybrid integrated circuit which is mounted on said motorized actuator and which is connected to the electric motor to control the angle of rotation of the output shaft of the electric motor by short wiring comprising ends of stator windings of the electric motor.

* * * * *